United States Patent
Shibayama et al.

(10) Patent No.: US 12,014,010 B2
(45) Date of Patent: Jun. 18, 2024

(54) INFORMATION PROCESSING DEVICE AND INFORMATION PROCESSING METHOD BASED ON INPUT OPERATION OF USER

(71) Applicant: SONY SEMICONDUCTOR SOLUTIONS CORPORATION, Kanagawa (JP)

(72) Inventors: Noribumi Shibayama, Kanagawa (JP); Takafumi Asahara, Kanagawa (JP); Takaki Ueno, Kanagawa (JP); Satomi Kawase, Kanagawa (JP); Suguru Kobayashi, Kanagawa (JP); Toshihisa Miyake, Kanagawa (JP); Kazuyuki Okuike, Kanagawa (JP); Goshi Watanabe, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/998,811

(22) PCT Filed: Apr. 12, 2021

(86) PCT No.: PCT/JP2021/015174
§ 371 (c)(1),
(2) Date: Nov. 15, 2022

(87) PCT Pub. No.: WO2021/241038
PCT Pub. Date: Dec. 2, 2021

(65) Prior Publication Data
US 2023/0176695 A1   Jun. 8, 2023

(30) Foreign Application Priority Data
May 28, 2020   (JP) .................. 2020-093253

(51) Int. Cl.
*G06F 3/042* (2006.01)
*G06F 3/041* (2006.01)
(Continued)

(52) U.S. Cl.
CPC .......... *G06F 3/0425* (2013.01); *G06F 3/0418* (2013.01); *G06F 3/14* (2013.01);
(Continued)

(58) Field of Classification Search
CPC ... G06F 3/041–047; G06F 2203/04101; G06F 2203/04018; G06F 3/0418;
(Continued)

(56) References Cited

U.S. PATENT DOCUMENTS

| 6,434,255 | B1 * | 8/2002 | Harakawa | ............. G06F 3/0304 |
| | | | | 348/169 |
| 2013/0278503 | A1 * | 10/2013 | Hirata | ..................... G06F 3/017 |
| | | | | 345/158 |
| 2016/0034105 | A1 * | 2/2016 | Yamashirodani | ... G06F 3/04186 |
| | | | | 345/173 |

FOREIGN PATENT DOCUMENTS

| JP | 11-134089 A | 5/1999 |
| JP | 2012-137989 A | 7/2012 |

(Continued)

OTHER PUBLICATIONS

International Search Report and Written Opinion of PCT Application No. PCT/JP2021/015174, dated May 18, 2021, 10 pages of ISRWO.

*Primary Examiner* — Sanjiv D. Patel
(74) *Attorney, Agent, or Firm* — CHIP LAW GROUP

(57) ABSTRACT

The present embodiment is an information processing device adapted to a non-contact user interface. The information processing device includes a display control unit configured to perform control such that a first screen is (Continued)

displayed on a display, a feature recognition unit configured to recognize a feature related to a specific part of a user in a spatial coordinate system, a mapping unit configured to specify a position on the first screen, the position corresponding to a position of the specific part in the spatial coordinate system, according to a mapping algorithm on the basis of the feature, an input operation specifying unit configured to specify an input operation on the basis of content of the first screen and the position on the first screen, and a processing execution unit configured to execute processing on the basis of the input operation. The mapping unit causes a reference trajectory to be displayed on the first screen under the control of the display control unit, and determines an optimal mapping algorithm on the basis of a user trajectory according to a motion of the user with respect to the reference trajectory.

12 Claims, 13 Drawing Sheets

(51) Int. Cl.
*G06F 3/14* (2006.01)
*G06T 7/20* (2017.01)
*G06T 7/70* (2017.01)
*G06V 10/44* (2022.01)
*G06V 10/74* (2022.01)

(52) U.S. Cl.
CPC .................. *G06T 7/20* (2013.01); *G06T 7/70* (2017.01); *G06V 10/44* (2022.01); *G06V 10/761* (2022.01); *G06F 2203/04101* (2013.01); *G06F 2203/04108* (2013.01); *G06T 2207/30241* (2013.01)

(58) Field of Classification Search
CPC .... G06F 3/04186; G06F 3/017; G06F 3/0346; G06F 2218/12; G06F 3/0488; G06F 3/04883; G06F 2203/04104; G06F 3/01; G06F 3/0481; G06F 3/03545; G06F 3/0412
See application file for complete search history.

(56) References Cited

FOREIGN PATENT DOCUMENTS

| JP | 2016-134022 A | | 7/2016 |
|---|---|---|---|
| JP | 2016134022 A | * | 7/2016 |
| JP | 2017-199062 A | | 11/2017 |

* cited by examiner

INFORMATION PROCESSING DEVICE AND INFORMATION PROCESSING METHOD BASED ON INPUT OPERATION OF USER

CROSS REFERENCE TO RELATED APPLICATIONS

This application is a U.S. National Phase of International Patent Application No. PCT/JP2021/015174 filed on Apr. 12, 2021, which claims priority benefit of Japanese Patent Application No. JP 2020-093253 filed in the Japan Patent Office on May 28, 2020. Each of the above-referenced applications is hereby incorporated herein by reference in its entirety.

TECHNICAL FIELD

The present technology relates to an information processing device, an information processing method based on an input operation of a user, and a computer program for executing the method.

BACKGROUND ART

There has been proposed a non-contact user interface for a user interactively operating a computing device without directly touching a screen of a physical display. Such a non-contact user interface recognizes that, for example, an icon or an object representing a button within a screen displayed on the display is pointed by a gesture of the user and detects the icon or the object as an input operation.

For example, Patent Document 1 below discloses a pointing system capable of a pointing operation in a non-contact manner. This pointing system performs calibration processing prior to an actual pointing operation by a user to set a virtual touch panel that is a virtual plane contributing to the pointing operation by an operator and a reference panel contributing to detection of the pointing operation by the operator. In this calibration, a predetermined animation determined in advance is displayed on a display, and the user operates in accordance with the animation using a part of the body actually used by the user to perform the pointing operation.

CITATION LIST

Patent Document

Patent Document 1: Japanese Patent Application Laid-Open No. 2016-134022

SUMMARY OF THE INVENTION

Problems to be Solved by the Invention

In the pointing system disclosed in Patent Document 1, the calibration is performed on the respective virtual planes of the virtual touch panel and the reference panel, thereby, a part (for example, a hand or the like) of the body greatly moved by the pointing operation of the user is determined as an operation point, and a part with little motion (for example, a joint of the waist or the like) is determined as a base point.

However, the above-described existing pointing system of Patent Document 1 calculates a pointing position on the display by the pointing operation of the user by a combination of the operation point determined from the little motion and the base point determined from the small motion, and thus as a problem that the calculated pointing position becomes a pointing position different from an original intention. For example, in a case where the user consciously or unconsciously performs the pointing operation with an index finger with a wrist joint as an axis, a position on the display to which a virtual axis connecting a tip of the index finger with the wrist as the base point is extended is the pointing position. Meanwhile, in a case where the user consciously or unconsciously moves the entire arm and performs the pointing operation by a motion as if touching the virtual touch panel at hand with the index finger, a position obtained by directly mapping, on the display, a position as if touched on the virtual touch panel becomes the pointing position, unlike the above-described pointing position. As described above, since the pointing position on the display varies depending on how the user moves a specific part of the body to perform the pointing operation, there is a problem that the user cannot point to an intended position even if the user intends to perform the pointing operation correctly.

Therefore, an object of the technology according to the present disclosure is to provide a non-contact user interface technology capable of pointing to a correct position as intended by a user.

More specifically, an object of the present technology is to provide a non-contact user interface technology capable of executing calibration depending on how a user moves a specific part of a body for a pointing operation.

Furthermore, an object of the present technology is to provide a non-contact user interface technology capable of executing such calibration without making the user aware before an operation related to main processing.

Solutions to Problems

The present technology for solving the above problems includes the following matters used to specify the invention or technical features.

The present technology according to a certain aspect can be an information processing device adapted to a user interface capable of performing a non-contact input operation according to a screen displayed on a display. The information processing device includes: a display control unit configured to perform control such that a first screen is displayed on the display; a feature recognition unit configured to recognize a feature related to at least one specific part of a user in a predetermined spatial coordinate system; a mapping unit configured to specify a position on the first screen, the position corresponding to a position of the at least one specific part in the predetermined spatial coordinate system, according to one mapping algorithm on the basis of the feature recognized by the feature recognition unit; an input operation specifying unit configured to specify a predetermined input operation on the basis of content of the first screen and the position on the first screen; and a processing execution unit configured to execute predetermined processing on the basis of the predetermined input operation specified by the input operation specifying unit. The mapping unit includes a mapping adjustment unit configured to execute calibration related to the mapping algorithm. The mapping adjustment unit causes a predetermined reference trajectory to be displayed on the first screen of the display under the control of the display control unit. Moreover, the mapping adjustment unit determines the one mapping algorithm from a plurality of the mapping algorithms on the basis of a user trajectory according to a motion of the at least one specific part of the user with respect to the predetermined reference trajectory.

Furthermore, the present technology according to another aspect can be an information processing method based on an input operation of a user via a non-contact user interface. The method includes: displaying a first screen on a display; recognizing a feature related to at least one specific part of a user in a predetermined spatial coordinate system; mapping a position of the at least one specific part in the predetermined spatial coordinate system to a position on the first screen according to one mapping algorithm on the basis of the recognized feature; specifying a predetermined input operation on the basis of content of the first screen and the position on the first screen; and executing predetermined processing on the basis of the specified predetermined input operation. The mapping includes executing calibration related to a mapping algorithm. The executing calibration includes:

displaying a predetermined reference trajectory on the first screen of the display; and determining the one mapping algorithm from a plurality of the mapping algorithms on the basis of a user trajectory according to a motion of the at least one specific part of the user with respect to the predetermined reference trajectory.

Moreover, the present technology according to another aspect can be a computer program for causing the information processing device to implement the information processing method based on an input operation of a user via a non-contact user interface, and a recording medium recording the computer program.

Note that, in the present disclosure, a term "system" as used herein refers to a logical assembly of a plurality of devices (or functional modules that implement specific functions), and it does not matter whether or not the devices or the functional modules are in a single housing. Furthermore, "means" does not simply mean physical means, and includes a case where a function of the means is implemented by software. Furthermore, the function of one means may be implemented by two or more physical means, or the functions of two or more means may be implemented by one physical means. Furthermore, the "means" can be read as, for example, a term such as "unit" or "module", and should not be construed as being limited to a specific "object" in the present disclosure.

Other technical features, objects, effects, or advantages of the present technology will be clarified by the following embodiments described with reference to the accompanying drawings. Furthermore, the effects described in the present disclosure are merely examples and are not limited, and other effects may be exhibited.

MODE FOR CARRYING OUT THE INVENTION

Figure 1:
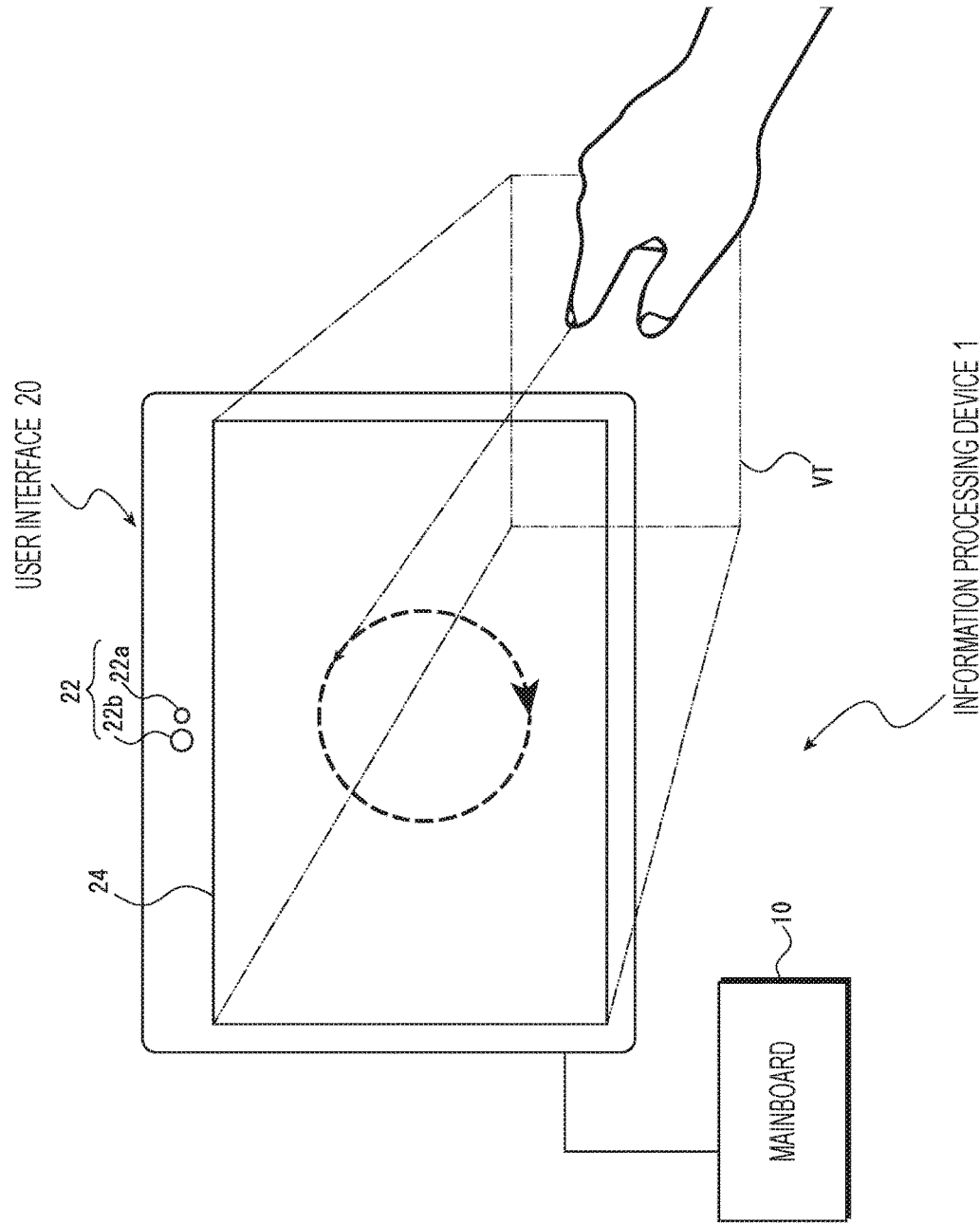
FIG. 1 is a schematic diagram for describing a user interface using an information processing device according to an embodiment of the present technology.

Hereinafter, embodiments of the present technology will be described with reference to the drawings. Note that the embodiments to be described below are merely examples and are not intended to exclude various modifications and applications of techniques that are not explicitly described below. The present technology can be implemented by making various modifications (for example, combining the embodiments, for the like) without departing from the gist of the present technology. Furthermore, in the description of drawings below, the same or similar parts are represented by the same or similar reference numerals. The drawings are schematic and do not necessarily match actual dimensions, ratios, and the like. Dimensional relationships and ratios are different among the drawings.

FIG. 1 is a schematic diagram for describing a user interface using an information processing device according to an embodiment of the present technology. An information processing device 1 of the present embodiment is a computing device adapted to a user interface capable of non-contact interactive operation. The non-contact interactive operation is, for example, an operation that enables a user to give an instruction (pointing) or an input to a screen displayed on a display by a motion of a specific part (for example, a finger or the like) of the user without touching the screen. In the present disclosure, a virtual touch panel surface VT, which is a virtual planar space for the user to perform a pointing operation on the screen of the display, is set in front of the display, but the present disclosure is not limited thereto. For example, the present technology may be a user interface that recognizes the pointing operation of the user without using the virtual touch panel surface VT.

As illustrated in the drawing, the information processing device 1 includes a mainboard 10 and a user interface 20.

The mainboard 10 is a computing device main body for controlling the user interface 20. The user interface 20 includes an imaging camera 22 and a display 24. In the present example, the imaging camera 22 includes a light source 22a for irradiating an object in front, and a light receiving unit 22b that receives reflected light from the object. The example in the drawing illustrates a state in which the user who faces the display 24 with a predetermined distance from the display 24 traces, with a finger, a circular figure drawn on the screen displayed on the display, for example. In the present disclosure, the information processing device 1 estimates a characteristic or tendency of the motion in the pointing operation of the user, using such a gesture of the user, and performs calibration based on a result of the estimation, thereby to enable the user to implement the pointing operation as intended, as will be described below. The circular figure drawn on the screen may be expressed by, for example, an animation in which a trajectory is drawn from a start point to an end point. Furthermore, the figure to be drawn is not limited to a circular figure, and may be another geometric figure or the like.

Figure 2:
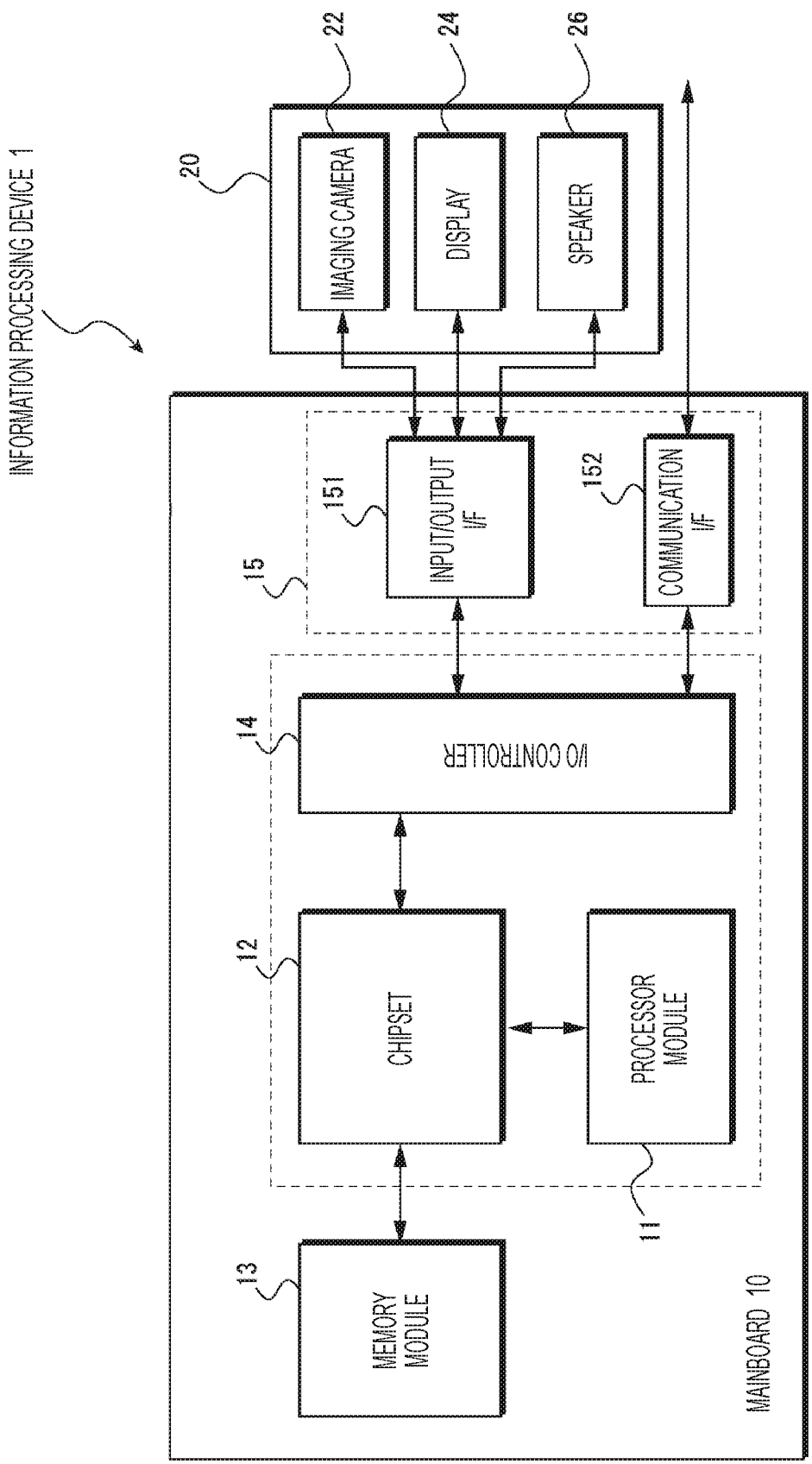
FIG. 2 is a block diagram illustrating an example of a hardware configuration of the information processing device according to the embodiment of the present technology.

FIG. 2 is a block diagram illustrating an example of a hardware configuration of the information processing device according to the embodiment of the present technology. In the drawing, among various hardware resources constituting the information processing device 1, those particularly related to the present disclosure are illustrated.

As illustrated in the drawing, the information processing device 1 illustrated in the present example typically includes the mainboard 10 that can include one or more processor modules 11, a chipset 12, a memory module 13, an I/O controller 14, and various peripheral interfaces 15, and the user interface 20 that can include various input/output devices 22 to 26.

The processor module 11 includes, for example, without limitation, a processor (processor core), a microcontroller, a digital signal processor, and/or combinations thereof. The chipset 12 includes a bridge for a bus that connects the processor module 11, the memory module 13, the I/O controller 14, and the like, and a circuit in which other components necessary for configuring the information processing device 1 are integrated.

The memory module 13 is typically a primary storage device including a volatile memory (for example, a RAM), a nonvolatile memory (for example, a ROM, a flash memory, or the like), and/or a combination thereof. The memory module 13 retains all or part of various software resources, for example, a device driver, an operating system (OS) program, one or more application programs, data, and the like, and is provided for use of the processor module 11. In the present embodiment, the memory module 13 can retain a program (user interface device driver) for controlling the user interface 20. The data includes, for example, various display data for implementing the user interface 20.

The I/O controller 14 is a circuit that controls input/output with respect to the various peripheral interfaces 15 (for example, an input/output interface 151, a communication interface 152, and the like). The input/output interface 151 controls operations of external input/output devices such as the imaging camera 22, the display 24, and the speaker 26, for example. The communication interface 152 is a circuit that enables network communication with an external device.

The imaging camera 22 is a device including an image sensor (not illustrated) that captures the motion of the user in an imaging area in front of the display 24. In the present disclosure, the image sensor is a distance measuring sensor capable of measuring a distance to an object (for example, a face, a finger, or the like of the user) and outputting distance measurement data thereof. As the distance measuring sensor, for example, a TOF sensor is known. The TOF sensor can output the distance measurement data regarding the distance to the object by receiving reflected light from the object based on light emitted from a light source. As the TOF sensor, for example, a direct TOF sensor and an indirect TOF sensor are known. The distance measurement data is converted into distance image data by processing of the processor module 11. The distance image data includes depth information (depth information) in a three-dimensional (XYZ) spatial coordinate system. The imaging camera 22 and the display 24 constitute the non-contact user interface 20 under the control of the processor module 11. Note that, in the present disclosure, a distance measuring sensor is used as the image sensor, but the present embodiment is not limited thereto, and any device or configuration may be used as long as the device or the configuration is capable of acquiring three-dimensional position information. For example, a stereo camera may be used as the imaging camera 22, or a configuration in which an ultrasonic sensor is combined with a two-dimensional image sensor may be used.

The display 24 is a device for displaying the user interface screen including text and images. Typically, the display 24 corresponds to a liquid crystal display or an organic display, but is not limited thereto, and may be, for example, a projection-type display device such as a projector.

The speaker 26 is a device that outputs audio or sound on the basis of an audio signal generated by a sound processor (not illustrated). The speaker 26 outputs, for example, a voice, a sound effect, or the like that assists or produces an input operation of the user via the non-contact user interface 20 under the control of the processor module 11.

Figure 3:
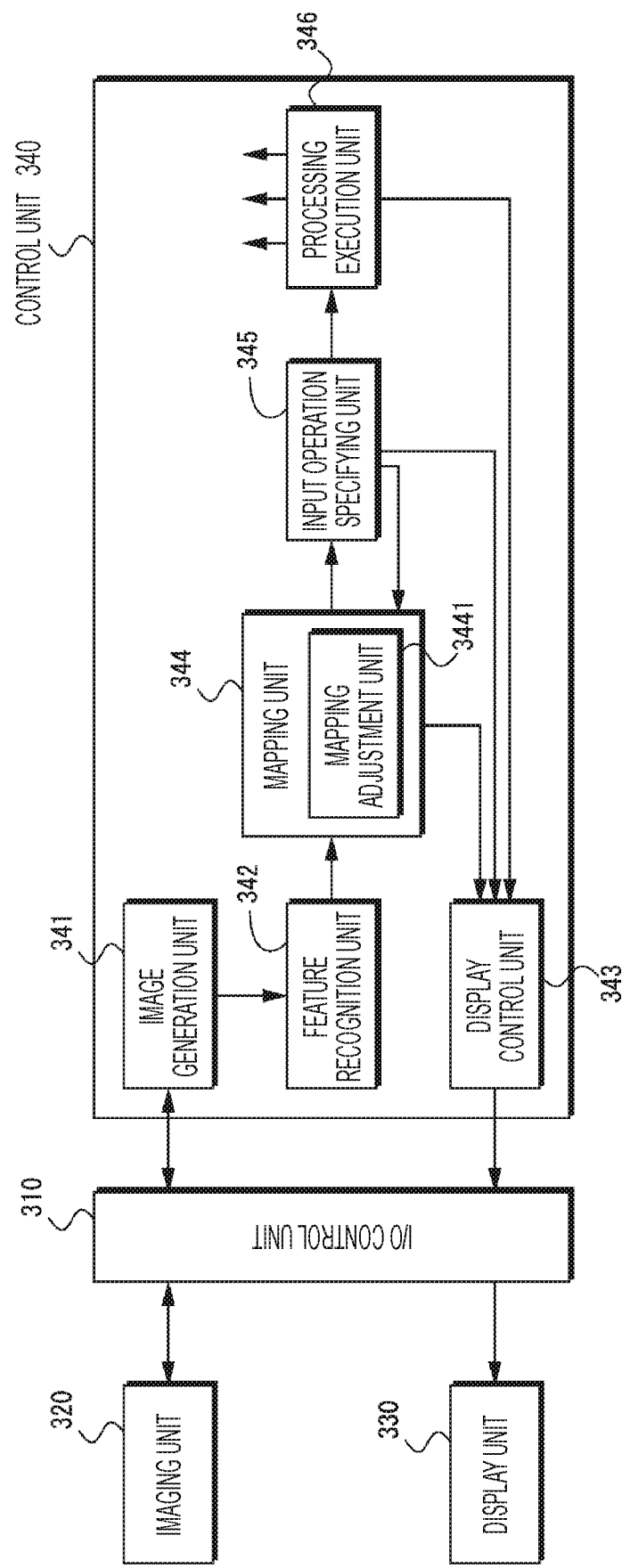
FIG. 3 is a block diagram illustrating an example of a functional configuration of the information processing device according to the embodiment of the present technology.

FIG. 3 is a block diagram illustrating an example of a functional configuration of the information processing device according to the embodiment of the present technology. In the drawing, among various configuration elements (components) of the information processing device 1, those particularly related to the present disclosure are illustrated. Such configuration elements can be implemented by the above-described hardware resources themselves or a part thereof and/or, for example, by the processor module of the information processing device 1 executing various device drivers and programs on the OS in cooperation with various hardware resources.

That is, as illustrated in the drawing, the information processing device 1 of the present example includes an I/O control unit 310, a display unit 330, an imaging unit 320, and a control unit 340.

The I/O control unit 310 controls input/output with respect to the imaging unit 320, the display unit 330, and the like. The imaging unit 320 emits light from the light source 22a, images reflected light from the user in front of the screen of the display unit 330 by the light receiving unit 22b (see FIG. 1), and outputs the distance measurement data thereof to the control unit 340 via the I/O control unit 310. In the present disclosure, from a certain viewpoint, the I/O control unit 310 can be regarded as an acquisition unit that acquires the distance measurement data from the imaging unit 320. The display unit 330 is connected to a display control unit 343 via the I/O control unit 310, and displays the screen provided to the user under the control of the display control unit 343. The screen provided to the user can be, for example, an initial screen or a menu screen including text and graphical images, a guidance screen, a software keyboard screen, or the like. In the present disclosure, as will be described below, the initial screen is an unlock operation screen for unlocking the information processing device 1 for use, and is also a calibration screen on which calibration is performed such that a correct position is pointed by the pointing operation of the user. Furthermore, content of the screen of the display unit 330 changes and/or a predetermined icon or the like is displayed under the control of the control unit 340 according to the motion of at least one specific part (for example, fingertip, wrist, or the like) of the user imaged by the imaging unit 320, thereby implementing the non-contact user interface 20.

The control unit 340 integrally controls the information processing device 1 adapted to the non-contact user interface. The control unit 340 is implemented by the above-described processor module 11 executing a predetermined program in cooperation with other hardware resources. The control unit 340 of the present example includes an image generation unit 341, a feature recognition unit 342, a display control unit 343, a mapping unit 344, an input operation specifying unit 345, and a processing execution unit 346.

The image generation unit 341 acquires a sequence of the distance measurement data output from the imaging unit 320 every moment via the I/O control unit 310, and generates the distance image data for each frame on the basis of the acquired sequence of distance measurement data. The distance image data is three-dimensional spatial coordinate data including depth information. The image generation unit 341 passes the generated distance image data to the feature recognition unit 342. In the present disclosure, from a certain viewpoint, the image generation unit 341 can be regarded as the acquisition unit that acquires the distance measurement data from the imaging unit 320.

The feature recognition unit 342 performs image recognition processing for the generated distance image data for each frame, extracts or recognizes a feature related to at least one specific part of the user, and generates and outputs a sequence of position information of the feature. For example, the feature recognition unit 342 can recognize a feature related to a user's fingertip end in the vicinity of the virtual touch panel surface VT. The feature includes, for example, a sequence of position information (three-dimensional vector data) in a three-dimensional spatial coordinate system indicating a position of a joint of a body. For example, the feature recognition unit 342 estimates a posture or body motion of the user on the basis of the distance image data, and further three-dimensionally estimates the specific part, thereby recognizing the position/posture/motion of the feature. In the present disclosure, from a certain viewpoint, the feature recognition unit 342 can be grasped as a position specifying unit that specifies the position of the specific part of the user in the three-dimensional spatial coordinate system. The feature recognition unit 342 includes, for example, a deep neural network. The feature recognized by the feature recognition unit 342 is passed to the mapping unit 344.

The mapping unit 344 maps the position of at least one specific part of the user in the three-dimensional spatial coordinate system to a pointing position of the user in a two-dimensional spatial coordinate system. That is, the mapping unit 344 calculates position information of the pointing position of the user on the screen of the display 24 using a predetermined mapping algorithm on the basis of the feature recognized by the feature recognition unit 342. The mapping unit 344 adjusts the mapping by determining an optimum mapping algorithm. In the present disclosure, the mapping unit 344 includes a mapping adjustment unit 3441.

The mapping adjustment unit 3441 calibrates and adjusts the mapping to the pointing position on the screen with respect to the pointing position of the user in the three-dimensional spatial coordinate system according to a motion characteristic in the pointing operation of the user. For example, the mapping adjustment unit 3441 animates and displays a predetermined trajectory on the screen displayed on the display unit 330 so as to guide the user's pointing operation, and determines a mapping algorithm for specifying the pointing position on the screen corresponding to the pointing operation of the user on the basis of the motion of the specific part of the user in response to the predetermined trajectory. As an example, the mapping adjustment unit 3441 executes mapping calibration processing prior to use of the information processing device 1 by the user. As another example, the mapping adjustment unit 3441 executes mapping calibration in a case where the pointing operation of the user repeats an erroneous operation while the information processing device 1 is used.

Figure 4A:
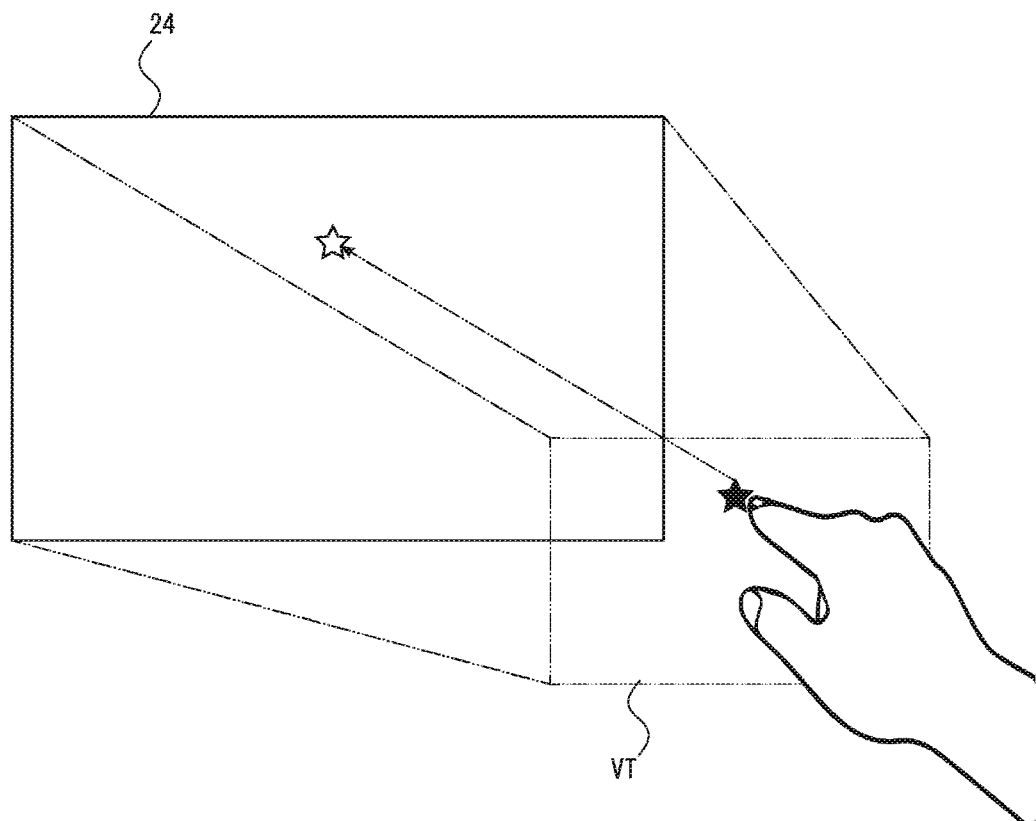
FIGS. 4A and 4B are diagrams for describing mapping to a pointing position on a screen of a display according to a pointing operation of a user.
Figure 4B:
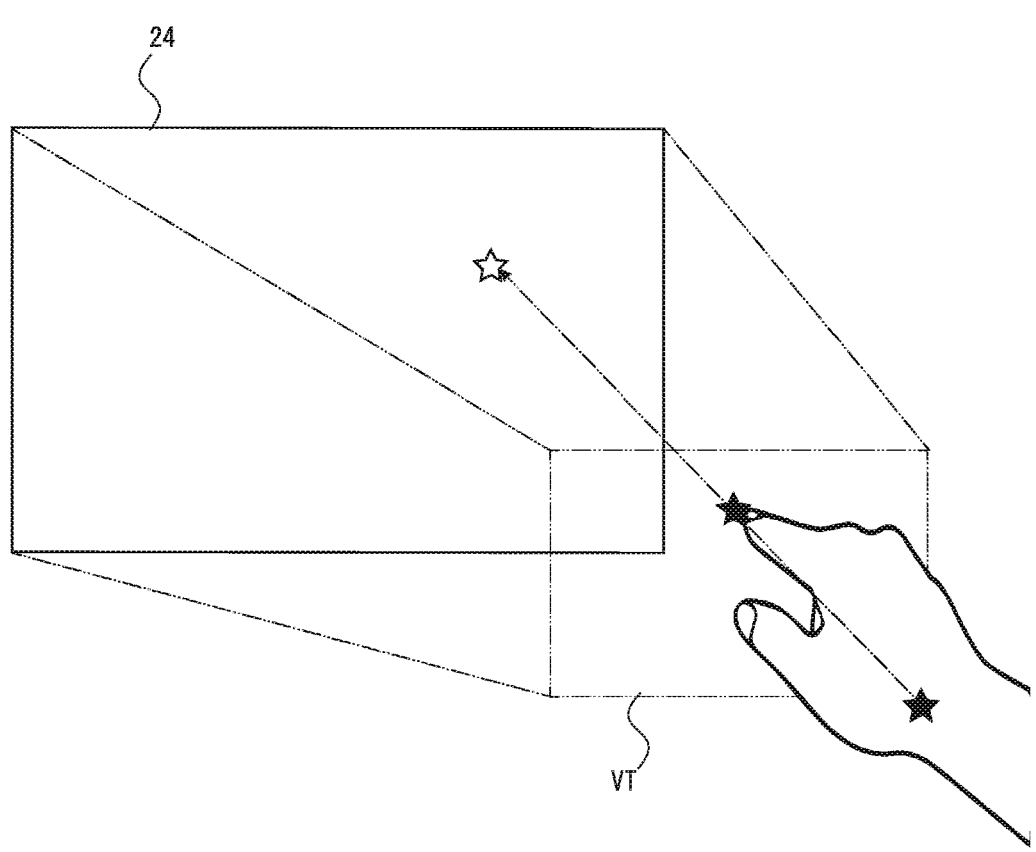

FIGS. 4A and 4B are diagrams for describing mapping of the pointing operation of the user and the pointing position on the screen of the display 24. More specifically, FIG. 4A illustrates the pointing position on the screen of the display 24 in a case where the user performs the pointing operation as if the user touches the virtual touch panel surface VT. That is, in FIG. 4A, a position where the position pointed by the user on the virtual touch panel surface VT is directly mapped on the screen of the display 24 becomes the pointing position with respect to the screen. In the present disclosure, such mapping is referred to as a direct mapping method.

Meanwhile, FIG. 4B illustrates the pointing position on the screen of the display 24 in a case where the user performs the pointing operation with an index finger, using a wrist joint as an axis. That is, in FIG. 4B, regardless of whether or not the user is conscious of the virtual touch panel surface VT, a position on the screen of the display 24, the position being located ahead of extension of a virtual axis connecting the wrist of the user and a tip of the index finger, becomes the pointing position with respect to the screen. In the present disclosure, such mapping is referred to as a vector mapping method.

As described above, in the non-contact user interface, the pointing position on the screen of the display 24 is different depending on whether or not the user is conscious of the virtual touch panel surface VT (direct mapping method), how the user moves the specific part to perform the pointing operation (vector mapping method), or the like, and therefore, even if the user intends to correctly perform the pointing operation, the user may not be able to point at an intended position. Therefore, to eliminate such an unintended shift of the pointing position, the mapping adjustment unit 3441 performs calibration prior to use of the information processing device 1, for example.

Returning to FIG. 3, the input operation specifying unit 345 specifies the input operation according to displayed content on the screen on the basis of the position information on the screen specified by the mapping unit 344. In the present disclosure, the input operation may be based on a simple position and/or motion of the specific part of the user or may be specified by a combination of a plurality of motions. For example, the input operation specifying unit 345 determines whether or not a button icon or the like, which is drawn on the screen, is pointed on the basis of the position information of the pointing position on the screen specified by the mapping unit 344 and position information of the button icon, and specifies the icon as the input operation of the user in a case of determining that the icon is pointed. Furthermore, the input operation specifying unit 345 can recognize the motion of the specific part on the basis of the sequence of the position information indicated by the feature. In the present disclosure, the input operation specifying unit 345 specifies the position pointed by the user on the displayed screen according to the mapping algorithm determined by the mapping adjustment unit 3441. The input operation specifying unit 345 notifies the display control unit 343 and the processing execution unit 346 of the specified input operation.

Furthermore, the input operation specifying unit 345 monitors whether or not the pointing operation of the user effectively functions, and prompts the user to instruct the mapping adjustment unit 3441 to execute calibration in a case of determining that the pointing operation does not effectively function under a predetermined condition.

The processing execution unit 346 executes predetermined processing according to the specified input operation. For example, in a case where the specified input operation is an operation of selecting the button icon, the processing execution unit 346 executes processing associated with the button icon and/or instructs another configuration element (not illustrated) to execute processing. In a case of changing the screen displayed on the display unit 330 by execution of processing, the processing execution unit 346 instructs the display control unit 343 to generate image data according to the change in the screen.

Figure 5:
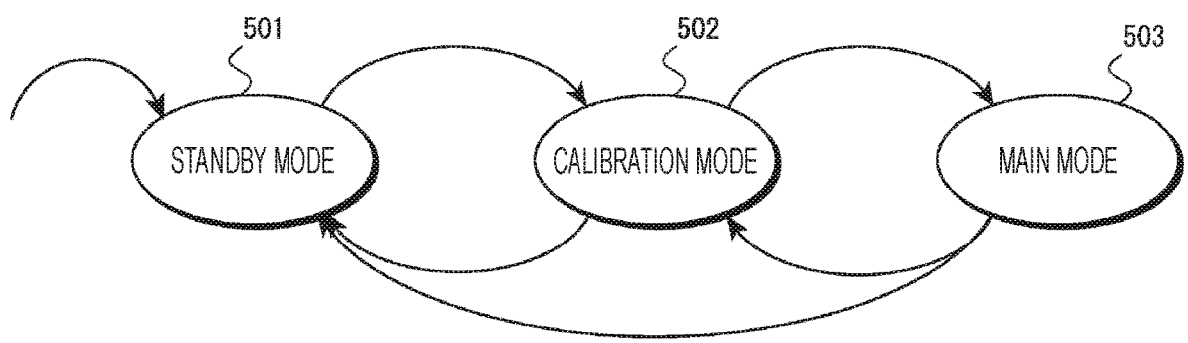
FIG. 5 is a diagram for schematically describing an operation mode of the information processing device according to the embodiment of the present technology.

FIG. 5 is a diagram for schematically describing an operation mode of the information processing device according to the embodiment of the present technology. As illustrated in the drawing, the information processing device 1 has, for example, a standby mode 501, a calibration mode 502, and a main mode 503. The standby mode 501 is a mode immediately after the information processing device 1 is activated or when the information processing device 1 is in a sleep state. In the standby mode 501, the information processing device 1 monitors a dynamic phase in the imaging area using the imaging unit 320, for example, and shifts to the calibration mode 502 in a case of detecting some dynamic phase due to approach of the user or the like, for example. The calibration mode 502 is a mode for executing the mapping calibration. In the calibration mode 502, the information processing device 1 displays an initial screen (unlock operation screen) on the display 24 to prompt the user to unlock the information processing device. The user performs the pointing operation according to content of the initial screen (unlock operation screen), and the information processing device 1 determines the mapping algorithm according to the pointing operation at this time. After completion of the mapping calibration, the information processing device 1 shifts to the main mode 503. The main mode 503 is a normal execution mode of the information processing device 1, and accepts various inputs by the pointing operation of the user and executes processing corresponding the input. In the main mode 503, while the information processing device 1 accepts various inputs by the user's pointing operation, the information processing device 1 shifts to the calibration mode 502 when detecting a state that the pointing operation is invalid at a certain rate and prompts the user to perform the pointing operation for the mapping calibration.

Figure 6A:
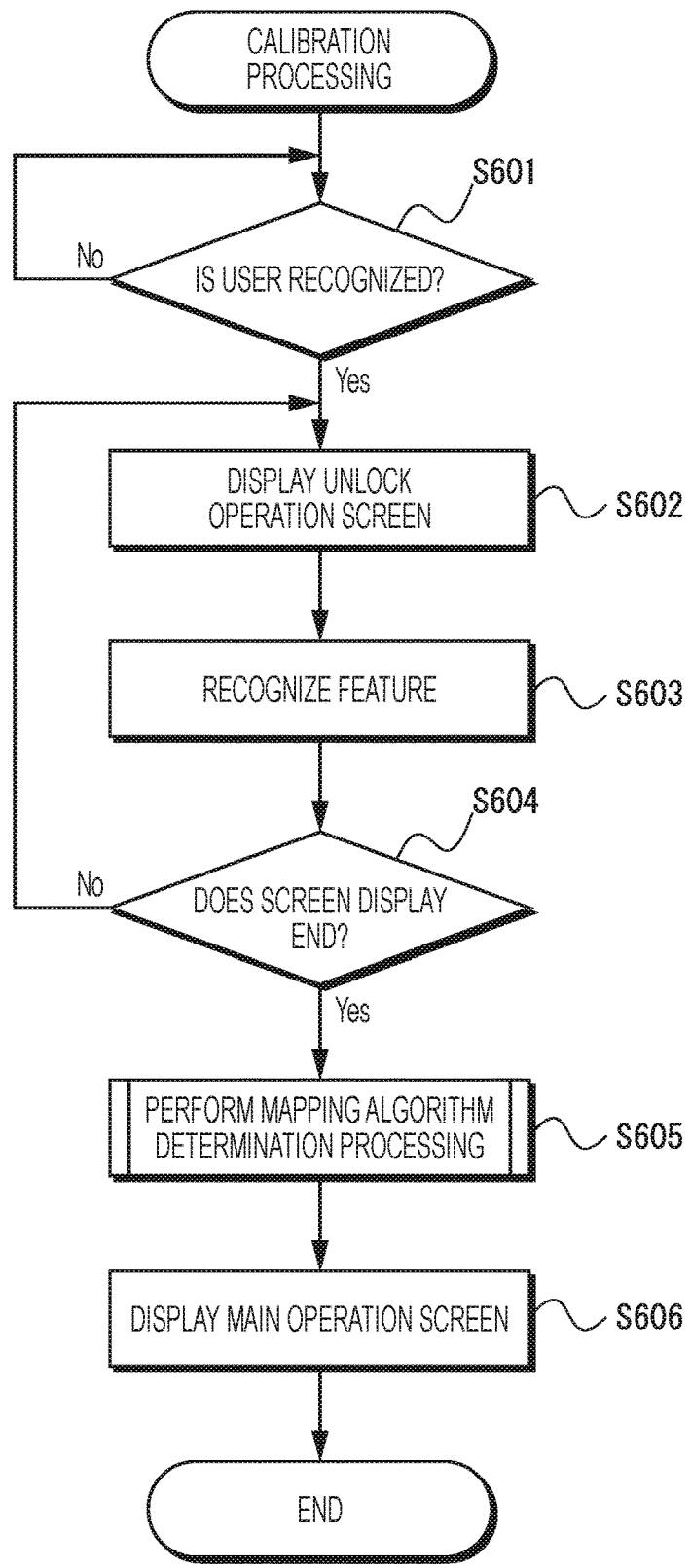
FIG. 6A is a flowchart for describing an example of calibration processing in the information processing device according to the embodiment of the present technology.
Figure 6B:
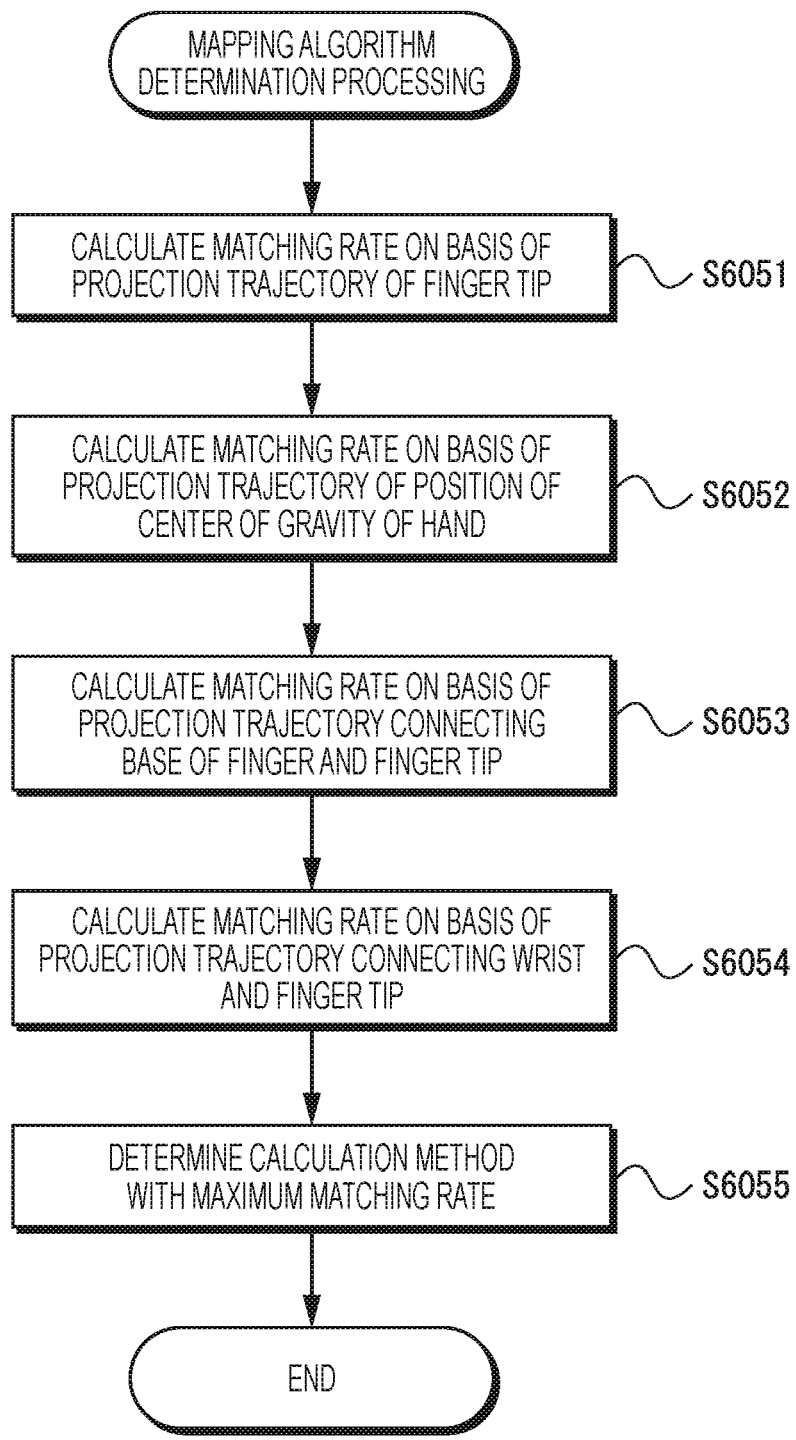
FIG. 6B is a flowchart for describing an example of mapping algorithm determination processing illustrated in FIG. 6A.
Figure 7A:
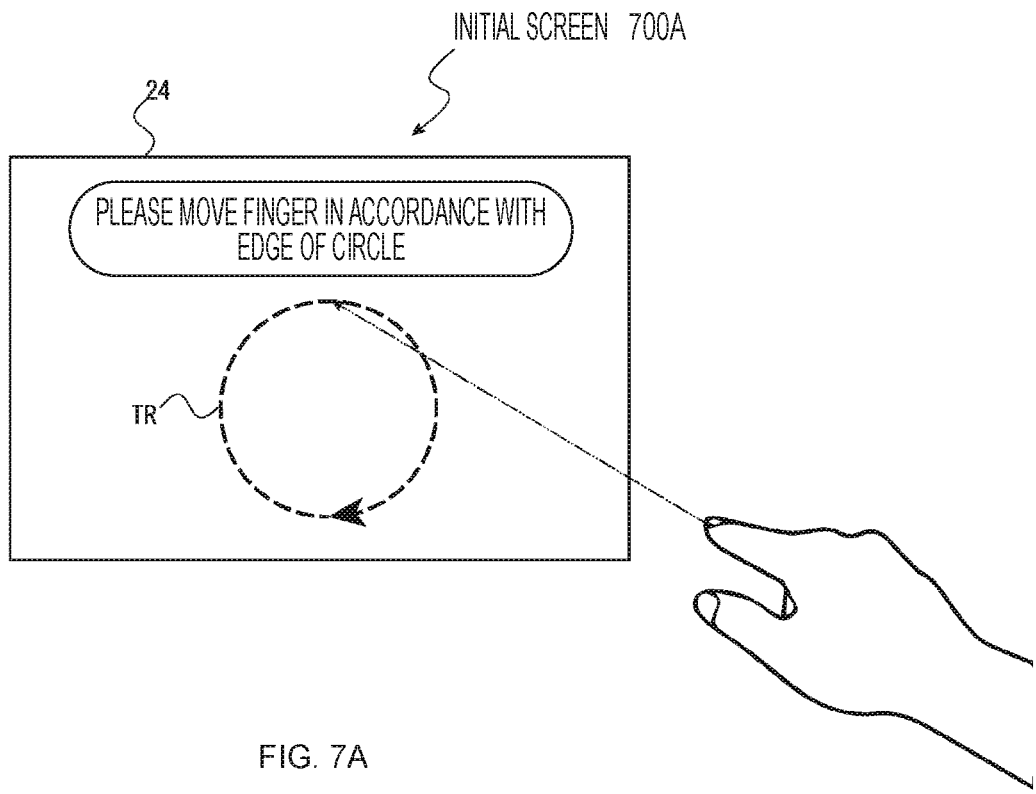
FIGS. 7A and 7B are diagrams illustrating examples of the screen displayed on the display of the information processing device according to the embodiment of the present technology.
Figure 7B:
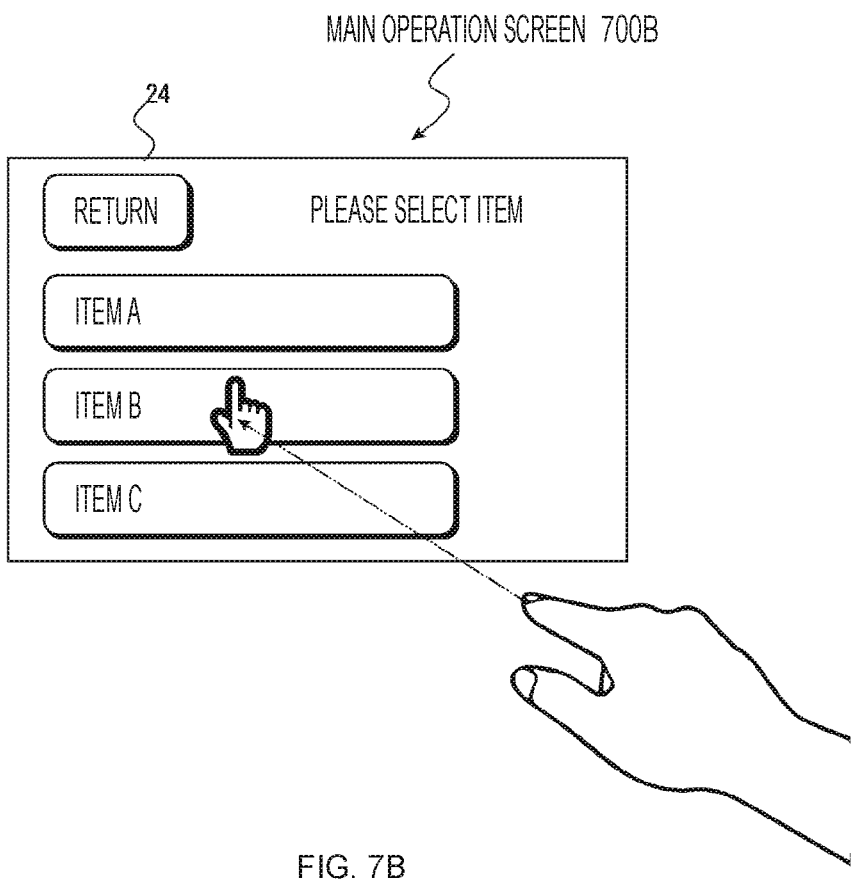

FIGS. 6A, 6B, 7A, and 7B are flowcharts for describing an example of user interface processing in the information processing device according to the embodiment of the present technology. More specifically, FIGS. 6A and 6B are flowcharts for describing an example of the calibration processing in the information processing device 1, and FIGS. 7A and 7B are flowcharts for describing an example of recalibration processing in the information processing device 1. Such processing is implemented by, for example, the processor module 11 of the information processing device 1 executing a predetermined user interface device driver in cooperation with the above-described hardware resources.

As illustrated in the drawing, the control unit 340 of the information processing device 1 monitors the dynamic phase in the imaging area using the imaging unit 320 in the standby mode (S601). For example, in a case of recognizing the user in the imaging area (Yes in S601), the control unit 340 shifts to the calibration mode, displays an initial screen (unlock operation screen) 700A for unlock as illustrated in FIG. 7A on the display 24, and prompts the user to perform the pointing operation (S502). On the initial screen 700A, the user is prompted to trace, with a finger, a trajectory (for example, a trajectory representing a circular figure; hereinafter, referred to as a "reference trajectory") TR, which is displayed as an animation on the screen of the display 24. The control unit 340 generates the distance image data on the basis of the distance measurement data output from the imaging unit 320, further recognizes the feature related to the specific part of the user on the basis of the generated distance image data, and records the feature (S503). The feature is recognized until the animation display ends (S504). Note that the control unit 340 may perform animation display of the reference trajectory a plurality of times, and may record the motion of the user according to each animation display.

When the animation display on the screen ends (Yes in S504), the control unit 340 performs processing for determining the mapping algorithm (S505). The mapping algorithm determination processing is processing of estimating a characteristic or tendency of the motion in the pointing operation of the user and determining the optimal mapping algorithm on the basis of a result of the estimation. The mapping algorithm determination processing will be described with reference to FIG. 6B. When having determined the optimum mapping algorithm by the mapping algorithm determination processing, the control unit 340 shifts to the main mode, and displays a main operation screen 700B as illustrated in FIG. 7B to prompt the user to perform the pointing operation (S506). In the present example, the main operation screen 700B is configured as a menu screen. The control unit 340 displays an instruction icon (cursor icon) in a superimposed manner at a position on the screen at which the user will be pointing with the finger, so that the user can recognize where on the screen the user is pointing. The user selects a predetermined button icon on the main operation screen 700B by the pointing operation, and the information processing device 1 executes processing associated with the selected button icon.

Figure 8A:
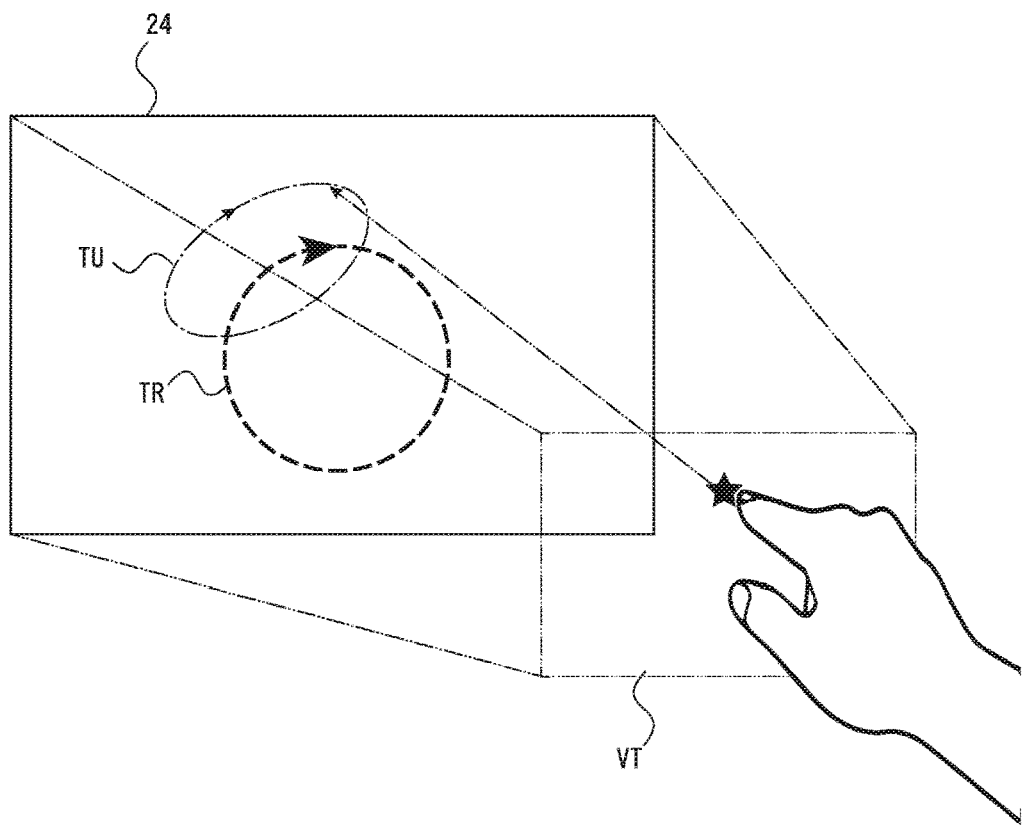
FIGS. 8A and 8B is a are diagrams for describing mapping to a pointing position on the screen of the display according to a pointing operation of the user.
Figure 8B:
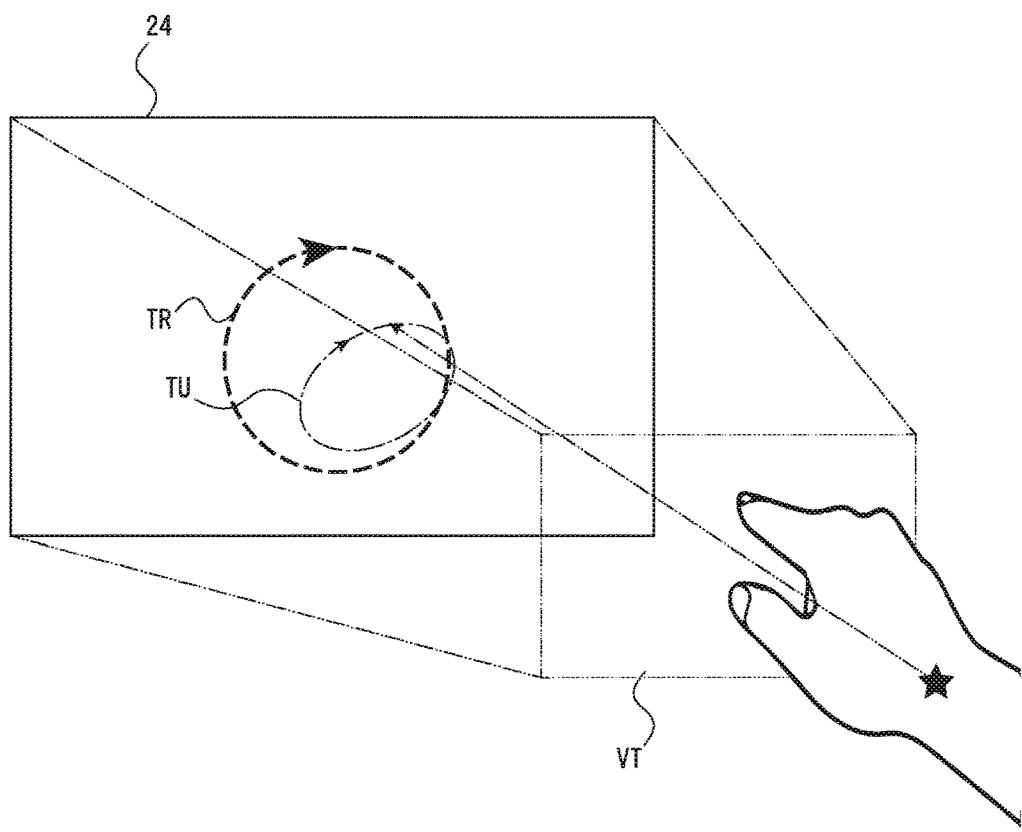
Figure 9A:
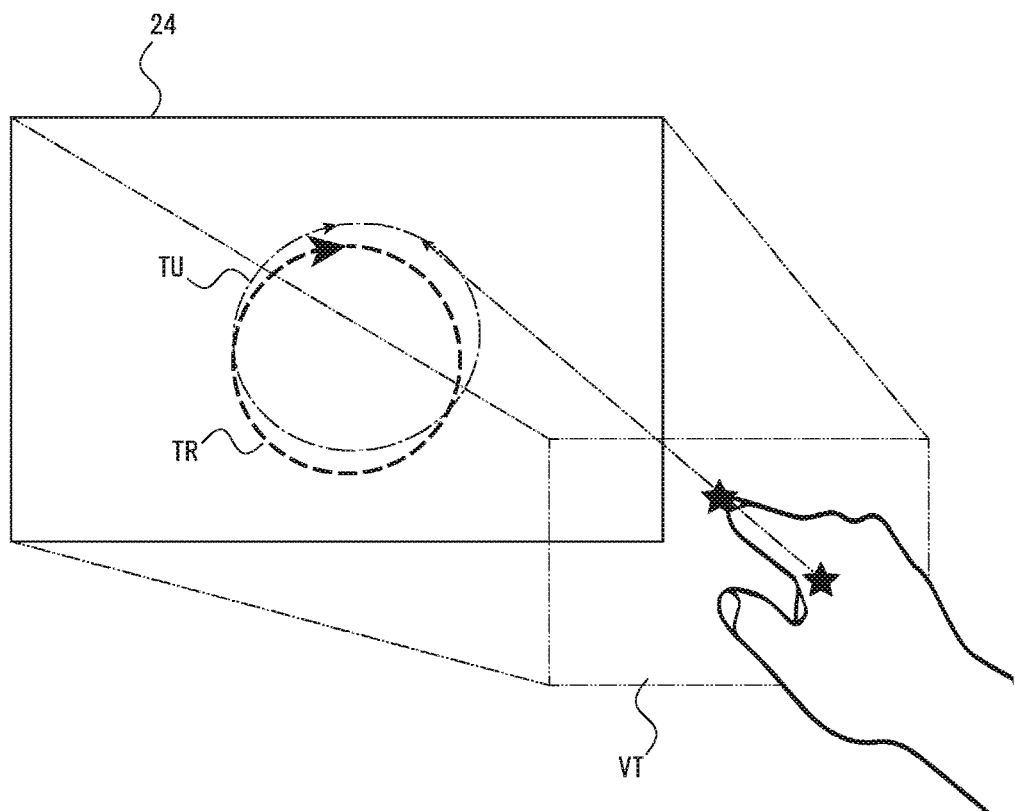
FIGS. 9A and 9B is a are diagrams for describing mapping to a pointing position on the screen of the display according to a pointing operation of the user.
Figure 9B:
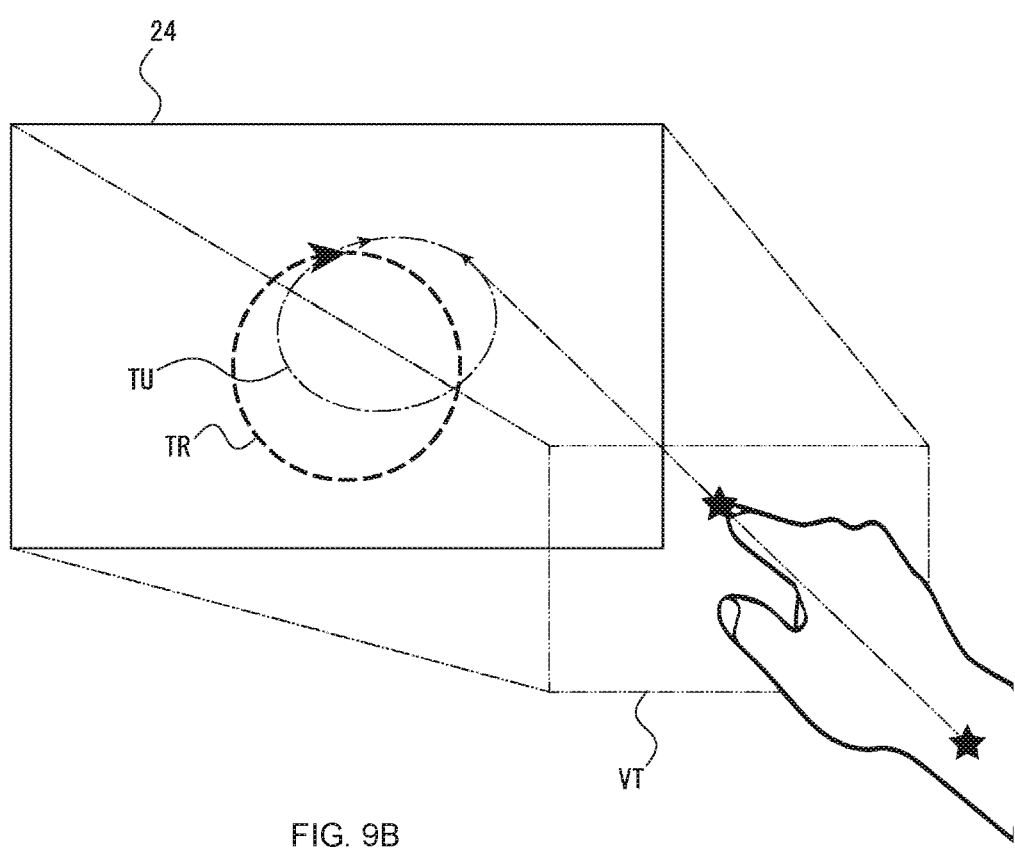

Next, the mapping algorithm determination processing will be described. In the mapping algorithm determination processing, a trajectory (hereinafter referred to as a "user trajectory") TU is calculated, in which the motion of the finger by the pointing operation of the user is mapped on the screen according to each of algorithms (mapping algorithms) for implementing a plurality of previously prepared mapping methods, and one mapping algorithm by which the optimum user trajectory TU is obtained is determined. In the present disclosure, a direct mapping algorithm that implements the direct mapping method illustrated in FIGS. 8A and 8B and a vector mapping algorithm that implements the vector mapping method illustrated in FIGS. 9A and 9B are illustrated.

Figure 10:
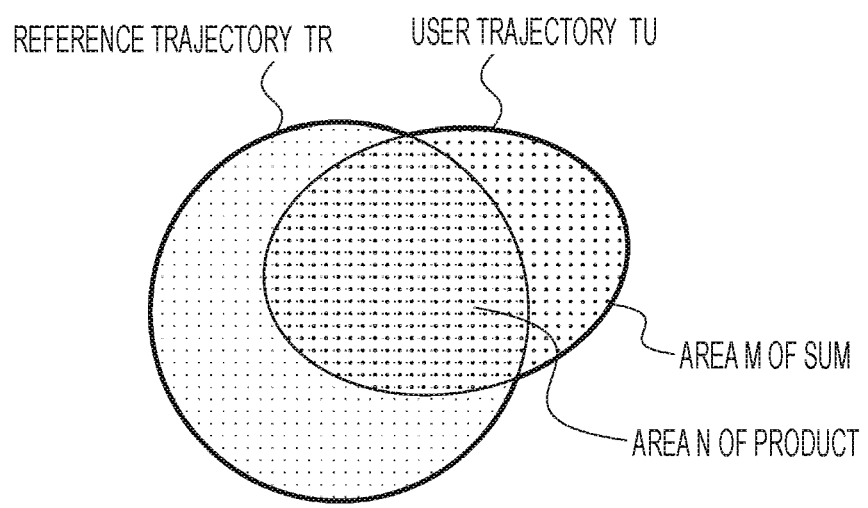
FIG. 10 is a diagram for describing a matching rate between a reference trajectory and a user trajectory in the information processing device according to the embodiment of the present technology.

That is, as illustrated in FIG. 6B, the control unit 340 calculates a matching rate with respect to the reference trajectory TR on the basis of the trajectory mapped according to a first direct mapping algorithm (S6051). For example, as illustrated in FIG. 8A, the control unit 340 calculates, as the first direct mapping algorithm, the user trajectory TU in which the motion of the index finger tip of the user on the virtual touch panel surface VT is mapped on the screen, compares the user trajectory TU with the reference trajectory TR drawn on the screen, and calculates the matching rate (or similarity). For example, as illustrated in FIG. 10, the matching rate is a ratio between an area M of a sum of an area a of a closed figure formed by the reference trajectory TR and an area b of a closed figure formed by the user trajectory TU, and an area N of a product of the area a and the area b, that is, the matching rate is calculated by:

the matching rate=$N/M$.

Next, the control unit 340 calculates the matching rate with respect to the reference trajectory TR on the basis of the trajectory mapped according to a second direct mapping algorithm (S6052). For example, as illustrated in FIG. 8B, the control unit 340 calculates, as the second direct mapping algorithm, the user trajectory TU in which the motion of a center of gravity (for example, near the back of a hand) of the user on the virtual touch panel surface VT is mapped on the screen, compares the user trajectory TU with the reference trajectory TR drawn on the screen, and similarly calculates the matching rate.

Next, the control unit 340 calculates the matching rate with respect to the reference trajectory TR on the basis of the trajectory mapped according to a first vector mapping algorithm (S6053). For example, as illustrated in FIG. 9A, the control unit 340 calculates, as the first vector mapping algorithm, the user trajectory TU mapped on the screen by extending a virtual axis connecting the index finger tip and the base of the user's finger on the virtual touch panel surface VT, compares the user trajectory TU with the reference trajectory TR drawn on the screen, and similarly calculates the matching rate (S6053).

Next, the control unit 340 calculates the matching rate with respect to the reference trajectory on the basis of the trajectory mapped according to a second vector mapping algorithm (S6053). For example, as illustrated in FIG. 9B, the control unit 340 calculates, as the second vector mapping algorithm, the user trajectory TU mapped on the screen by extending a virtual axis connecting the index finger tip and the base (joint) of the user's wrist on the virtual touch panel surface VT, compares the user trajectory TU with the reference trajectory TR drawn on the screen, and similarly calculates the matching rate (S6054).

After calculating the matching rate for each of the predetermined mapping algorithms, the control unit 340 determines one mapping algorithm corresponding to the maximum matching rate among these matching rates (S6055).

As described above, in the present disclosure, the matching rate between the reference trajectory TR and each user trajectory TU is calculated, and the mapping algorithm corresponding to the maximum matching rate is determined, whereby the characteristic or tendency of the motion in the pointing operation of the user can be inferred.

Note that, in the above example, the aspect of calculating the matching rate using the four mapping algorithms has been described. However, the present embodiment is not limited thereto. For example, only two mapping algorithms may be used, or five or more mapping algorithms may be used. Furthermore, the calculation of the matching rate is not limited to the above example, and another calculation method (for example, an approximation method) may be used.

Furthermore, in the above-described example, the information processing device 1 is configured to recognize the feature related to the specific part of the user and determine the optimal mapping algorithm for one time of animation display of the reference trajectory on the initial screen 700A. However, the present embodiment is not limited thereto, and the information processing device 1 may be configured to recognize a plurality of features for each of a plurality of times of animation display and determine the optimal mapping algorithm on the basis of the plurality of features.

Figure 11:
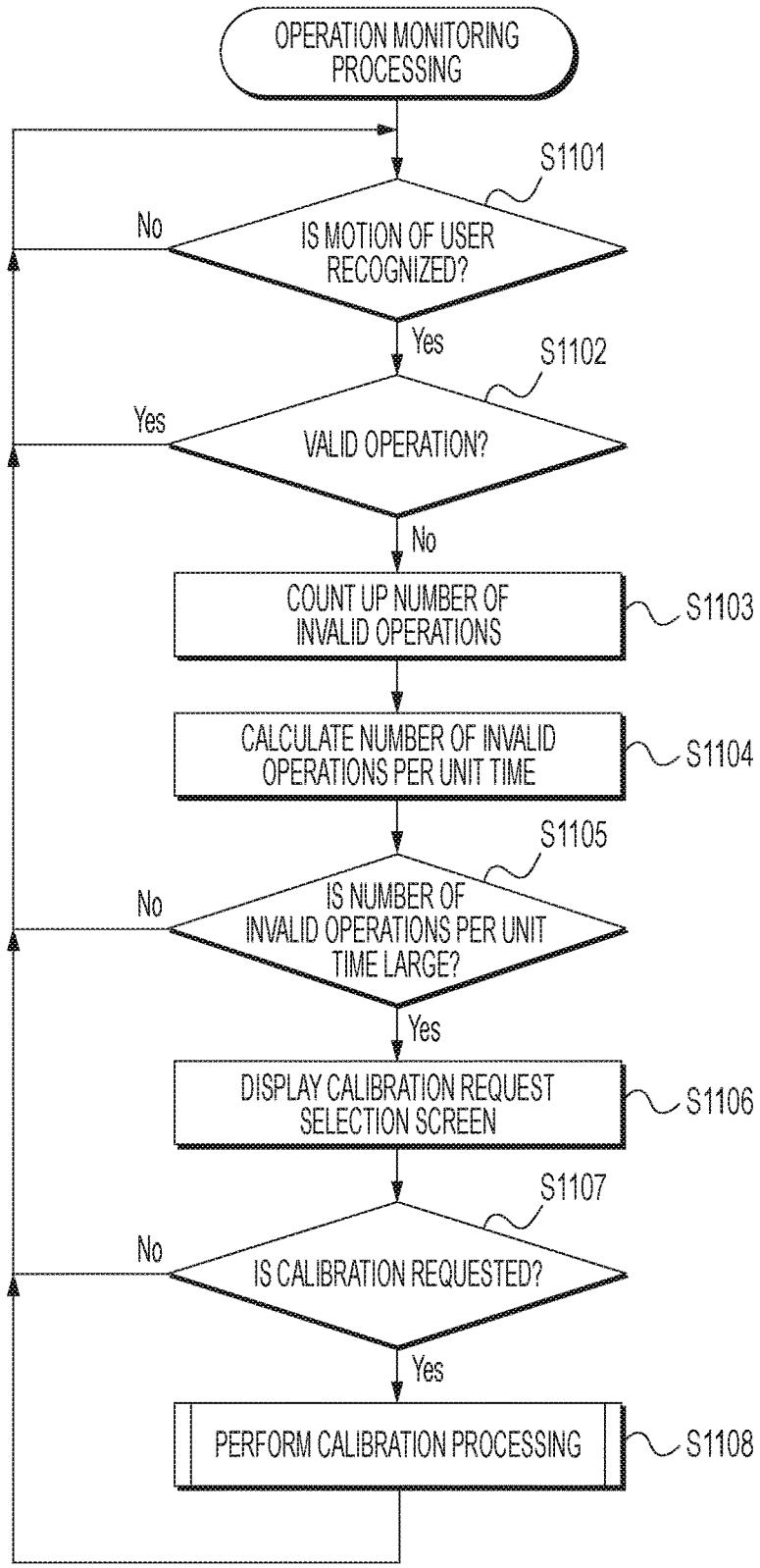
FIG. 11 is a flowchart for describing an example of operation monitoring processing in the information processing device according to the embodiment of the present technology.

FIG. 11 is a flowchart for describing an example of operation monitoring processing in the information processing device according to the embodiment of the present technology. Such processing is implemented by, for example, the processor module 11 of the information processing device 1 executing a predetermined user interface device driver in cooperation with the above-described hardware resources. The operation monitoring processing is processing executed in the main mode 503 (see FIG. 5), and is processing of monitoring whether or not the pointing operation of the user effectively functions and prompting the user to execute the recalibration in a case of determining that the pointing operation does not effectively function.

That is, as illustrated in the drawing, the control unit 340 monitors whether or not there is any motion of the user on the basis of the distance measurement data output from the imaging unit 320 (S1101). In a case of determining that there is the motion of the user (Yes in S1101), the control unit 340 determines whether or not the motion is a valid pointing operation (S1102). For example, in a case where the input operation specifying unit 345 can specify the input operation according to the user's pointing operation, it is determined that the input operation is a valid pointing operation. In a case of determining that the motion of the user is the valid pointing operation (Yes in S1102), the control unit 340 returns to the processing of S1101 and monitors the next motion of the user.

In a case of determining that the motion of the user is not a valid pointing operation (No in S1102), the control unit 340 counts up the number of invalid operations (S1103). Next, the current number of invalid operations per unit time is calculated (S1104). The unit time may be, for example, any time of 5 seconds, 10 seconds, 15 seconds, 30 seconds, 60 seconds or more, or any time therebetween. The control unit 340 determines whether or not the number of invalid operations per unit time exceeds a predetermined threshold (S1105). The predetermined threshold may be set in advance on the basis of, for example, statistics based on an average number of pointing operations of the user.

Figure 12:
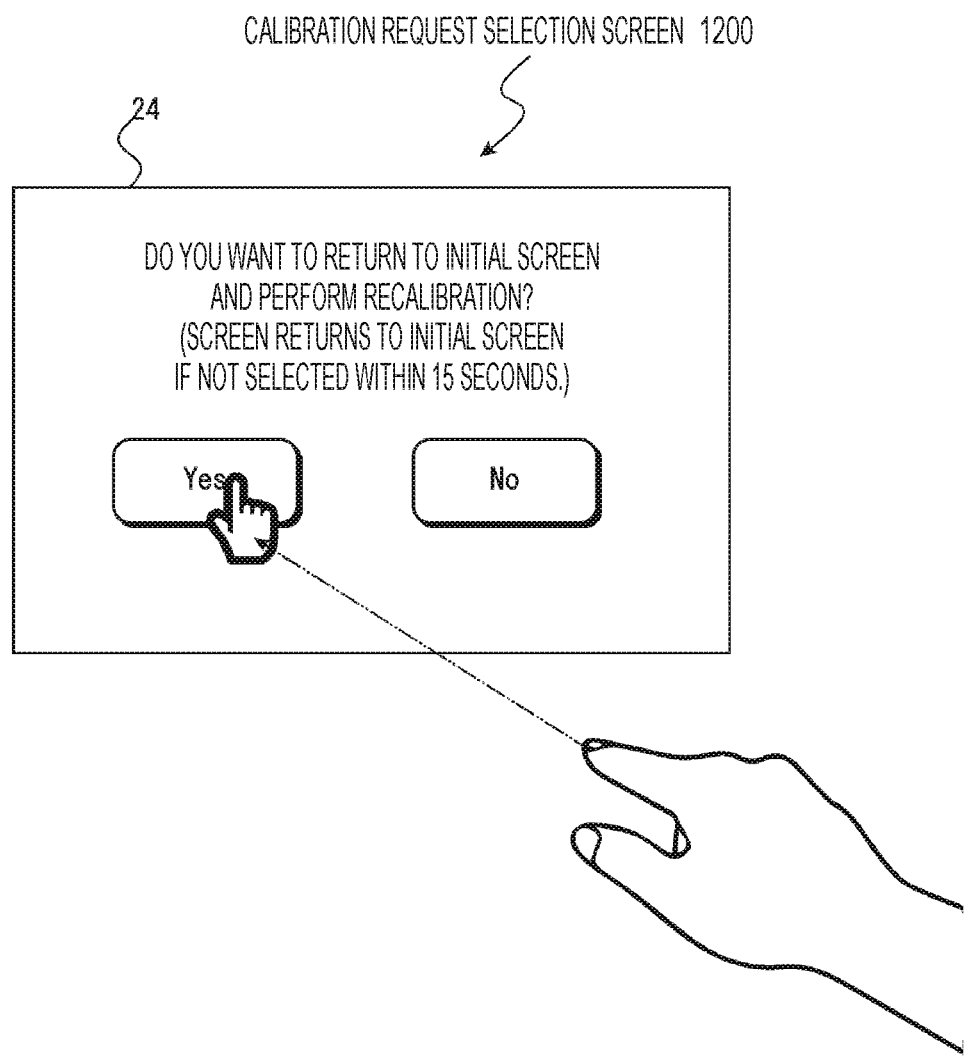
FIG. 12 is a diagram illustrating an example of the screen displayed on the display of the information processing device according to the embodiment of the present technology.

In a case of determining that the number of invalid operations per unit time exceeds the predetermined threshold (Yes in S1105), it is considered that erroneous operations increase in the pointing operation of the user, and thus the control unit 340 performs control such that a calibration request selection screen 1200 is displayed on the display 24 as illustrated in FIG. 12, for example (S1106). Alternatively, the control unit 340 may perform control such that the calibration request selection screen 1200 is displayed, for example, in a case where a valid input operation has not been detected in the pointing operation for the past 60 seconds or in a case where the instruction icon is not in a stationary state. The user can select whether or not to request recalibration by the pointing operation on the calibration request selection screen 1200.

In a case where the user requests recalibration on the calibration request selection screen 1200 (Yes in S1107), the control unit 340 executes the calibration processing illustrated in FIGS. 6A and 6B (S1108). On the other hand, in a case where the user does not request recalibration on the calibration request selection screen 1200 (No in S1107), the control unit 340 continues the input operation by the user's pointing operation using the current mapping algorithm.

Furthermore, in a case where the current mapping algorithm determined by the calibration processing is not actually adapted to the motion of the user, for example, there is a possibility that the user cannot correctly select by the pointing operation on the calibration request selection screen 1200. Therefore, the control unit 340 determines whether or not the user has performed the pointing operation within a predetermined time (for example, 15 seconds), and can forcibly perform recalibration in a case of determining that the user has not performed any pointing operation within the predetermined time, on the calibration request selection screen 1200.

As described above, according to the present embodiment, it becomes possible to point to a correct position as intended by the user. In particular, according to the present embodiment, it becomes possible to execute the calibration of the mapping algorithm depending on how the user moves the specific part of the body for the pointing operation.

Furthermore, according to the present embodiment, it becomes possible to execute such calibration without making the user aware before the operation related to the main processing.

Each of the above-described embodiments is an example for describing the present technology, and it is not intended to limit the present technology only to these embodiments. The present technology can be implemented in various forms without departing from the gist of the present technology.

For example, in the method disclosed in the present specification, the steps, operations, or functions may be performed in parallel or in a different order as long as there is no inconsistency in the results. The described steps, operations, and functions are provided merely as examples, and some of the steps, operations, and functions can be omitted or may be combined with each other to form one step, operation, or function without departing from the gist of the present technology, or other steps, operations, or functions may be added.

Furthermore, although various embodiments are disclosed in the present specification, a certain feature (technical matter) in one embodiment can be added to or replaced with a certain feature in another embodiment while being appropriately improved, and such a form is also included in the gist of the present technology.

Furthermore, the present technology may include the following technical matters.

(1) An information processing device adapted to a user interface capable of performing a non-contact input operation according to a screen displayed on a display, the information processing device including:
a display control unit configured to perform control such that a first screen is displayed on the display;
a feature recognition unit configured to recognize a feature related to at least one specific part of a user in a predetermined spatial coordinate system;
a mapping unit configured to specify a position on the first screen, the position corresponding to a position of the at least one specific part in the predetermined spatial coordinate system, according to one mapping algorithm on the basis of the feature recognized by the feature recognition unit;
an input operation specifying unit configured to specify a predetermined input operation on the basis of content of the first screen and the position on the first screen; and
a processing execution unit configured to execute predetermined processing on the basis of the predetermined input operation specified by the input operation specifying unit, in which
the mapping unit includes a mapping adjustment unit that executes calibration related to a mapping algorithm, and
the mapping adjustment unit
causes the first screen of the display to display a predetermined reference trajectory under the control of the display control unit, and
determines the one mapping algorithm from a plurality of the mapping algorithms on the basis of a user trajectory according to a motion of the at least one specific part of the user with respect to the predetermined reference trajectory.

(2) The information processing device (1), further including:
an image generation unit configured to generate distance image data for each frame on the basis of acquired distance measurement data, in which
the feature recognition unit recognizes the feature on the basis of the distance image data for each frame generated by the image generation unit.

(3) The information processing device (2), further including:
an imaging unit including a distance measuring sensor configured to measure a distance to an object by receiving reflected light from the object based on light emitted from a light source, in which
the imaging unit outputs the distance measurement data related to the measured distance.

(4) The information processing device (1), in which
the mapping unit performs mapping of the position of the at least one specific part on a virtual touch panel surface formed in front of the display to the position on the first screen according to a predetermined direct mapping algorithm.

(5) The information processing device (1), in which
the mapping unit performs mapping to the position on the first screen on the basis of the position of each of a plurality of the specific parts according to a predetermined vector mapping algorithm.

(6) The information processing device (1), in which
the mapping adjustment unit calculates a matching rate of the predetermined reference trajectory and the user trajectory according to the motion of the at least one specific part of the user for each of the plurality of mapping algorithms, and determines the one mapping algorithm on the basis of the calculated matching rate.

(7) The information processing device (6), in which
the mapping adjustment unit determines a mapping algorithm corresponding to a maximum matching rate among the calculated matching rates as the one mapping algorithm.

(8) The information processing device (1), in which
the display control unit performs control such that the predetermined reference trajectory is displayed on the first screen prior to use of the information processing device by the user.

(9) The information processing device (1), in which
a second screen for using the information processing device is displayed after the one mapping algorithm is determined by the mapping adjustment unit.

(10) The information processing device (1), in which the input operation specifying unit determines whether or not a pointing operation of the user effectively functions, and instructs the mapping adjustment unit to execute the calibration in a case where it is determined that the pointing operation of the user does not effectively function under a predetermined condition.

(11) The information processing device (10), in which the input operation specifying unit determines whether or not the pointing operation of the user effectively functions on the basis of whether or not the number of invalid operations per unit time exceeds a predetermined threshold.

(12) An information processing method based on an input operation of a user via a non-contact user interface, the method including:
  displaying a first screen on a display;
  recognizing a feature related to at least one specific part of the user in a predetermined spatial coordinate system;
  mapping a position of the at least one specific part in the predetermined spatial coordinate system to a position on the first screen according to one mapping algorithm on the basis of the recognized feature;
  specifying a predetermined input operation on the basis of content of the first screen and the position on the first screen; and
  executing predetermined processing on the basis of the specified predetermined input operation, in which
  the mapping includes executing calibration related to a mapping algorithm, and
  the executing calibration includes
  displaying a predetermined reference trajectory on the first screen of the display, and
  determining the one mapping algorithm from a plurality of the mapping algorithms on the basis of a user trajectory according to a motion of the at least one specific part of the user with respect to the predetermined reference trajectory.

(13) A computer program for causing a computing device to implement an information processing method based on an input operation of a user via a non-contact user interface, the information processing method including:
  displaying a first screen on a display;
  recognizing a feature related to at least one specific part of a user in a predetermined spatial coordinate system;
  mapping a position of the at least one specific part in the predetermined spatial coordinate system to a position on the first screen according to one mapping algorithm on the basis of the recognized feature;
  specifying a predetermined input operation on the basis of content of the first screen and a position on the first screen; and
  executing predetermined processing on the basis of the specified predetermined input operation, in which
  the mapping includes executing calibration related to the mapping algorithm, and
  the executing calibration includes
  displaying a predetermined reference trajectory on the first screen of the display, and
  determining the one mapping algorithm from a plurality of the mapping algorithms on the basis of a user trajectory according to a motion of the at least one specific part of the user with respect to the predetermined reference trajectory.

REFERENCE SIGNS LIST

1 Information processing device
10 Mainboard
11 Processor module
12 Chipset
13 Memory module
14 I/O controller
15 Peripheral interface
151 Input/output interface
152 Communication interface
20 User interface
22 Imaging camera
22a Light source
22b Light receiving unit
24 Display
26 Speaker
310 I/O control unit
320 Imaging unit
330 Display unit
340 Control unit
341 Image generation unit
342 Feature recognition unit
343 Display control unit
344 Mapping unit
3441 Mapping adjustment unit
345 Input operation specifying unit
346 Processing execution unit

The invention claimed is:

1. An information processing device adapted to a user interface capable to perform a non-contact input operation according to a screen displayed on a display, the information processing device comprising:
  a display control unit configured to perform control such that a first screen is displayed on the display;
  a feature recognition unit configured to recognize a feature related to at least one specific part of a user in a specific spatial coordinate system;
  a mapping unit configured to specify a position on the first screen according to one mapping algorithm based on the recognized feature, wherein the specified position corresponds to a position of the at least one specific part in the specific spatial coordinate system;
  an input operation specifying unit configured to specify a specific input operation based on content of the first screen and the position on the first screen; and
  a processing execution unit configured to execute a specific process based on the specific input operation specified by the input operation specifying unit, wherein
  the mapping unit includes a mapping adjustment unit configured to execute calibration related to a mapping algorithm, and
  the mapping adjustment unit is configured to:
    cause the first screen of the display to display a specific reference trajectory under the control of the display control unit,
    calculate a matching rate of the specific reference trajectory and a user trajectory based on a motion of the at least one specific part of the user for each of a plurality of mapping algorithms, and
    determine the one mapping algorithm from a plurality of the mapping algorithms based on the matching calculated matching rate and the user trajectory according to the motion of the at least one specific part of the user with respect to the specific reference trajectory.

2. The information processing device according to claim 1, further comprising:
an image generation unit configured to generate distance image data for each frame based on acquired distance measurement data, wherein
the feature recognition unit is further configured to recognize the feature based on the distance image data for each frame generated by the image generation unit.

3. The information processing device according to claim 2, further comprising:
an imaging unit including a distance measuring sensor configured to receive reflected light from an object based on light emitted from a light source to measure a distance to the object, wherein
the imaging unit is further configured to output the distance measurement data related to the measured distance.

4. The information processing device according to claim 1, wherein
the mapping unit is further configured to perform mapping of the position of the at least one specific part on a virtual touch panel surface in front of the display to the position on the first screen based on a specific direct mapping algorithm.

5. The information processing device according to claim 1, wherein the mapping unit is further configured to perform mapping to the position on the first screen based on a basis of the position of each of a plurality of the specific parts based on a specific vector mapping algorithm.

6. The information processing device according to claim 1, wherein the mapping adjustment unit is further configured to determine a mapping algorithm corresponding to a maximum matching rate among the calculated matching rates as the one mapping algorithm.

7. The information processing device according to claim 1, wherein the display control unit is further configured to perform control such that the specific reference trajectory is displayed on the first screen prior to use of the information processing device by the user.

8. The information processing device according to claim 1, wherein a second screen for using the information processing device is displayed after determination of the one mapping algorithm by the mapping adjustment unit.

9. The information processing device according to claim 1, wherein the input operation specifying unit is further configured to:
determine whether or not a pointing operation of the user effectively functions; and
instruct the mapping adjustment unit to execute the calibration based on determination that the pointing operation of the user does not effectively function under a specific condition.

10. The information processing device according to claim 9, wherein the input operation specifying unit is further configured to determine whether or not the pointing operation of the user effectively functions based on whether or not the number of invalid operations per unit time exceeds a specific threshold.

11. An information processing method based on an input operation of a user via a non-contact user interface, the method comprising:
displaying a first screen on a display;
recognizing a feature related to at least one specific part of the user in a specific spatial coordinate system;
mapping a position of the at least one specific part in the specific spatial coordinate system to a position on the first screen according to one mapping algorithm based on the recognized feature;
specifying a specific input operation based on content of the first screen and the position on the first screen; and
executing specific process based on the specified specific input operation, wherein
the mapping includes executing calibration related to a mapping algorithm, and
the executing calibration includes:
displaying a specific reference trajectory on the first screen of the display,
calculating a matching rate of the specific reference trajectory and a user trajectory based on a motion of the at least one specific part of the user for each of a plurality of mapping algorithms, and
determining the one mapping algorithm from a plurality of the mapping algorithms based on the matching calculated matching rate and the user trajectory according to the motion of the at least one specific part of the user with respect to the specific reference trajectory.

12. A non-transitory computer-readable medium having stored thereon, computer-executable instructions which, when executed by a computer, cause the computer to execute operations based on an input operation of a user via a non-contact user interface, the operations comprising:
displaying a first screen on a display;
recognizing a feature related to at least one specific part of a user in a specific spatial coordinate system;
mapping a position of the at least one specific part in the specific spatial coordinate system to a position on the first screen according to one mapping algorithm based on the recognized feature;
specifying a specific input operation based on content of the first screen and the position on the first screen; and
executing a specific process based on the specified specific input operation, wherein
the mapping includes executing calibration related to the mapping algorithm, and
the executing calibration includes
displaying a specific reference trajectory on the first screen of the display,
calculating a matching rate of the specific reference trajectory and a user trajectory based on a motion of the at least one specific part of the user for each of a plurality of mapping algorithms, and
determining the one mapping algorithm from a plurality of the mapping algorithms based on the matching calculated matching rate and the user trajectory according to the motion of the at least one specific part of the user with respect to the specific reference trajectory.

* * * * *